United States Patent
Momtaz et al.

(10) Patent No.: US 7,522,847 B2
(45) Date of Patent: Apr. 21, 2009

(54) CONTINUOUS TIME FILTER-DECISION FEEDBACK EQUALIZER ARCHITECTURE FOR OPTICAL CHANNEL EQUALIZATION

(75) Inventors: Afshin Momtaz, Laguna Hills, CA (US); Mario Caresosa, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 413 days.

(21) Appl. No.: 10/774,724

(22) Filed: Feb. 9, 2004

(65) Prior Publication Data

US 2005/0135475 A1    Jun. 23, 2005

Related U.S. Application Data

(60) Provisional application No. 60/531,403, filed on Dec. 19, 2003, provisional application No. 60/531,402, filed on Dec. 19, 2003, provisional application No. 60/530,968, filed on Dec. 19, 2003.

(51) Int. Cl.
*H04B 10/00* (2006.01)

(52) U.S. Cl. .................. 398/209; 398/208; 398/202

(58) Field of Classification Search ................. 398/149, 398/202–214; 375/233
See application file for complete search history.

(56) References Cited

U.S. PATENT DOCUMENTS

| | | | | |
|---|---|---|---|---|
| 5,179,302 A | * | 1/1993 | Wagner | 327/553 |
| 5,671,252 A | * | 9/1997 | Kovacs et al. | 375/316 |
| 5,774,505 A | * | 6/1998 | Baugh | 375/348 |
| 5,940,441 A | * | 8/1999 | Cranford et al. | 375/232 |
| 6,069,522 A | * | 5/2000 | Venkatraman et al. | 327/552 |
| 6,144,697 A | * | 11/2000 | Gelfand et al. | 375/233 |
| 6,233,107 B1 | * | 5/2001 | Minuhin | 360/51 |
| 6,285,709 B1 | * | 9/2001 | Alelyunas et al. | 375/233 |
| 6,968,167 B1 | * | 11/2005 | Wu et al. | 455/251.1 |
| 6,968,168 B1 | * | 11/2005 | Collier et al. | 455/264 |
| 7,016,406 B1 | * | 3/2006 | Phanse et al. | 375/232 |
| 7,054,606 B1 | * | 5/2006 | Sheng et al. | 455/306 |
| 7,302,461 B2 | * | 11/2007 | Mukherjee et al. | 708/819 |
| 2004/0044713 A1 | * | 3/2004 | Healey et al. | 708/322 |
| 2004/0151268 A1 | * | 8/2004 | Hidaka | 375/355 |
| 2005/0019042 A1 | * | 1/2005 | Kaneda et al. | 398/208 |
| 2005/0024151 A1 | * | 2/2005 | Chuan | 331/1 A |
| 2005/0123036 A1 | * | 6/2005 | Rahman et al. | 375/240 |

FOREIGN PATENT DOCUMENTS

| | | |
|---|---|---|
| EP | 0808046 A2 | 11/1997 |
| WO | 0213424 A2 | 4/2002 |

OTHER PUBLICATIONS

Garrido et al, "A comparative study of two adaptive continuous-time filters for decision feedback equalization read channels" Jun. 9-12, 1997, Circuits and Systems, 1997. ISCAS '97., Proceedings of 1997 IEEE International Symposium on, pp. 89-92 vol. 1.*

* cited by examiner

*Primary Examiner*—Agustin Bello (57) ABSTRACT

A communication system having a transmitter transmits an information signal over a communication media and a receiver coupled to the communication media receives the transmitted information signal. The receiver includes a continuous time filter having an adjustable bandwidth for linearly equalizing the transmitted information signal as a function of the adjustable bandwidth. A decision feedback equalizer coupled to the continuous time filter then reduces inter-symbol interference in the filtered information signal.

9 Claims, 7 Drawing Sheets

CONTINUOUS TIME FILTER-DECISION FEEDBACK EQUALIZER ARCHITECTURE FOR OPTICAL CHANNEL EQUALIZATION

CROSS-REFERENCE TO RELATED APPLICATION(S)

This application claims the benefit of U.S. Provisional Patent Application Ser. No. 60/531,403, entitled "CONTINUOUS TIME FILTER-DECISION FEEDBACK EQUALIZER ARCHITECTURE FOR OPTICAL CHANNEL EQUALIZATION", filed Dec. 19, 2003, the disclosure of which is incorporated herein by reference.

This application is related to U.S. Provisional Patent Application Ser. No. 60/531,402, entitled "DECISION FEEDBACK EQUALIZER AND CLOCK AND DATA RECOVERY CIRCUIT FOR HIGH SPEED APPLICATIONS", filed Dec. 19, 2003; and U.S. Provisional Patent Application Ser. No. 60/530,968, entitled "USING CLOCK AND DATA RECOVERY PHASE ADJUST TO SET LOOP DELAY OF A DECISION FEEDBACK EQUALIZER", filed Dec. 19, 2003, the disclosure of each of which is incorporated herein by reference.

BACKGROUND

Conventional communication systems transmit data signals at a given rate from a data transmitter to a data receiver over a communication media such as optical fiber, cable or twisted pair. Higher data transmission rates that enable enhanced telecommunications services may give rise to inter-symbol interference (ISI) when the frequency response of the communication media is non-flat over the bandwidth of the transmitted signal.

For example, in optical communication systems chromatic dispersion and polarization mode dispersion which result from variation of light propagation speed as a function of wavelength and propagation axes may create high levels of ISI at high data rates or for long channel lengths. These bandwidth limitations of typical fiber optical cable tend to spread transmitted pulses. If the width of the spread pulse exceeds a symbol duration, overlap with neighboring pulses may occur, which may limit the achievable bit error rate of the communication system.

SUMMARY

In one aspect of the present invention a communication device includes a continuous time filter having an adjustable bandwidth that linearly equalizes an incoming data signal. In this aspect of the present invention the communication device further includes a decision feedback equalizer coupled to the continuous time filter for reducing inter-symbol interference in the filtered incoming data signal.

In another aspect of the present invention a communication system includes a transmitter transmitting an information signal over a communication media and a receiver coupled to the communication media for receiving the transmitted information signal. In accordance with this aspect of the present invention the receiver includes a continuous time filter having an adjustable bandwidth that linearly equalizes a transmitted information signal as a function of the adjustable bandwidth of the continuous time filter. In this aspect of the present invention the receiver further includes a decision feedback equalizer coupled to the continuous time filter for reducing inter-symbol interference in the filtered information signal.

BRIEF DESCRIPTION OF THE DRAWINGS

These and other features, aspects, and advantages of the present invention will become better understood with regard to the following description, appended claims, and accompanying drawings, in which:

In accordance with common practice the various features illustrated in the drawings are not to scale. On the contrary, the dimensions of the various features are arbitrarily expanded or reduced for clarity. In addition like reference numerals denote like features throughout the specification and figures.

DETAILED DESCRIPTION

Figure 1:
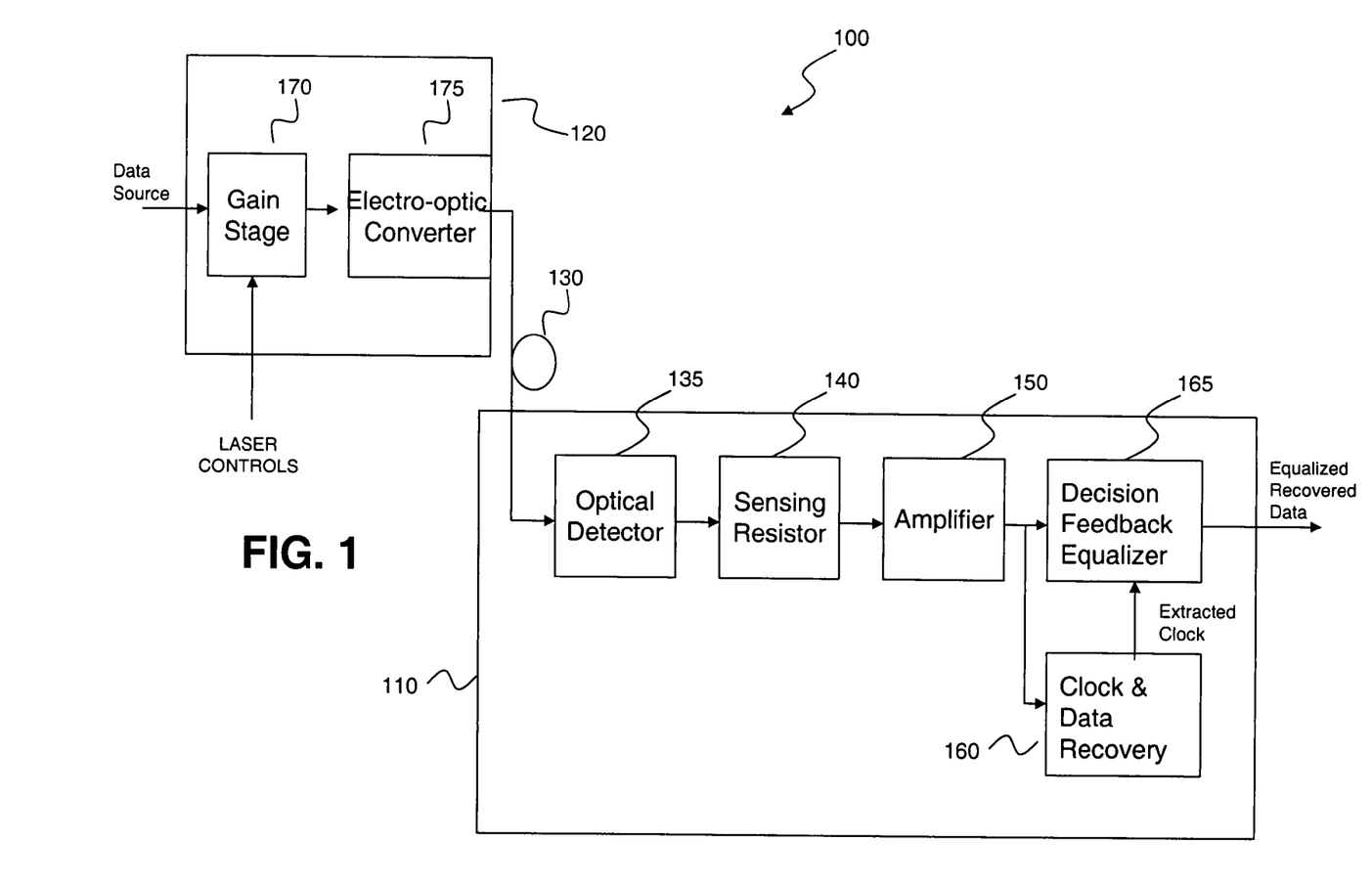
FIG. 1 is a simplified block diagram of one embodiment of an optical communication system.

Some embodiments of the present invention provide a high speed receiver with channel equalization for use in a communication system 100 as illustrated in the simplified block diagram of FIG. 1. In one embodiment, the communication system 100 may comprise an optical communication system having an optical transmitter 120 that converts an electrical signal to an optical signal for transmission over an optical fiber network 130 to an optical receiver 110. In this embodiment the optical receiver converts the received optical signal to an electrical signal. Those skilled in the art will appreciate that the present invention is not limited to optical communication systems. Nor is the present invention limited to a single optical transmitter and receiver. Rather practical optical communications systems may have one or more optical transmitters as well as one or more optical receivers.

The illustrated transmitter 120 includes, by way of example, one or more gain stage(s) 170 coupled to an electro-optic converter 175. In this embodiment the gain stage(s) amplify the incoming data signal and the amplified data signal in turn drives the electro-optic converter 175. In one embodiment an analog data source provides an analog data signal that modulates the output of the electro-optic converter 175. In other embodiments baseband digital modulation or frequency modulation may be used.

The gain stage 170 may have multiple stages, and may receive one or more control signals for controlling various different parameters of the output of the electro-optic converter. The electro-optic converter may, for example, be a light emitting diode, a surface emitting laser or an edge emitting laser that operate at high speeds such as 10 Gigabits per second (Gbps) or higher.

The illustrated receiver includes, by way of example, an optical detector 135, sensing resistor 140, one or more amplifier(s) 150, a clock and data recovery circuit 160, and an equalizer 165. The optical detector 135 can be any known prior art optical detector. Such prior art detectors convert incoming optical signals into corresponding electrical output signals that can be electronically monitored.

In operation, when the transmit optical beam is incident on a light receiving surface of the optical detector 135, electron-hole pairs are generated. A bias voltage applied across the device generates a flow of electric current having an intensity proportional to the intensity of the incident light. In one embodiment, this current flows through sensing resistor 140, and generates a voltage.

One or more amplifier(s) 150 coupled to the sensing resistor amplify the sensed voltage signal. The amplified voltage signal drives a clock and data recovery circuit 160 that extracts a clock from the amplified voltage signal and recovers the transmitted data. In addition, typical high speed receivers may also include an adaptive equalizer 165, such as for example, a decision feedback equalizer that removes or reduces channel induced distortions in the received optical data.

Decision feedback equalization techniques use feedback to cancel from the present symbol the interference from symbols which have already been detected. In practice, decision feedback equalization utilizes the known value of the current symbol(s) to determine and cancel the inter-symbol interference contributed by one or more prior symbol(s) in the present symbol by subtracting the previously detected symbol values with appropriate weighing.

Figure 2:
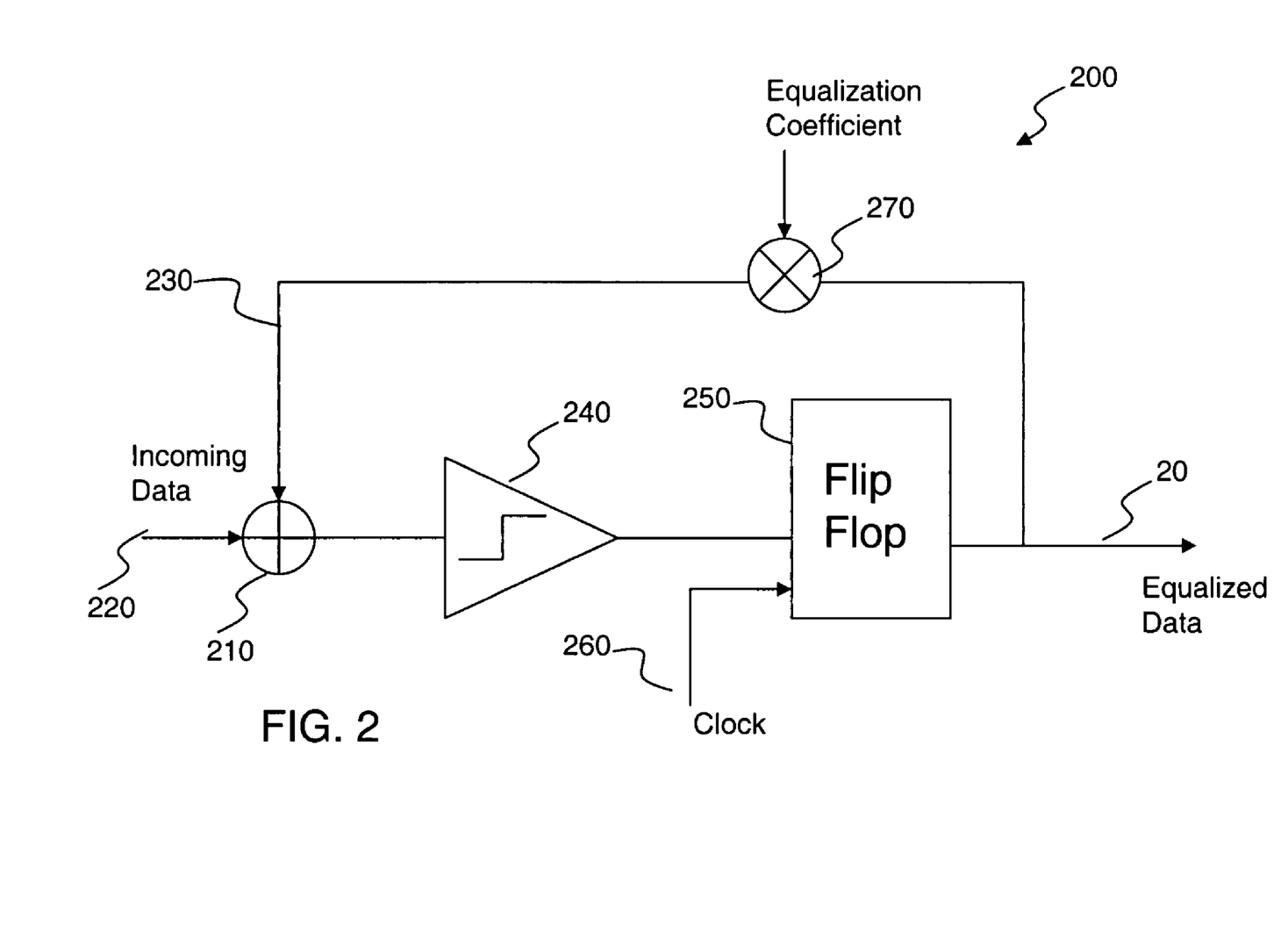
FIG. 2 is a simplified block diagram of one embodiment of a decision feedback equalizer.

For example, FIG. 2 is a simplified block diagram of a conventional one tap decision feedback equalizer 200 where a summer 210 combines incoming data 220 with a feedback signal 230. A slicer 240 converts the output of the summer (soft decision) to a binary signal. A flip flop 250 then recovers the data from the binary signal in response to an extracted clock 260.

In the illustrated embodiment a multiplier 270 scales the recovered data by an equalization coefficient (g1) to generate the feedback signal 230 that is then combined with incoming data. The value of the equalization coefficient depends on the level of inter-symbol interference that is present in the incoming data. Typically the absolute value of the equalization coefficient (usually a negative number) increases with increasing inter-symbol interference. In one embodiment a real time optimization loop (not shown), such as a least mean square optimization loop, monitors the bit error rate of the incoming signal and adjusts the value of the equalization coefficient in response to changes in the bit error rate.

Summer 210 then combines the equalized feedback signal 230 (typically a negative number) with the incoming data 220. The summer 210 therefore subtracts a scaled version of the previous symbol from a current symbol to reduce or eliminate channel induced distortion such as inter-symbol interference.

However, decision feedback equalizers may not efficiently compensate for pre-cursor inter-symbol interference i.e. interference caused by symbols transmitted after the current symbol. Therefore, as illustrated in FIG. 3, current receivers 300 often include a feed-forward filter 310 and decision feedback equalizer 320 to fully compensate for both pre-cursor and post-cursor interference.

In this embodiment the feed-forward filter comprises a multi-tap feed-forward equalizer with adjustable tap coefficients $c_1$-$c_n$. In the illustrated embodiment the time delay between taps may be as large as the symbol interval in which case the equalizer is a symbol-spaced equalizer. Typically however, the equalizer is a fractionally spaced equalizer having a time delay between adjacent taps that is less than the symbol interval to avoid aliasing. The total delay of the feed-forward filter is typically chosen to be greater than or equal to the pre-cursor delay spread.

Figure 3:
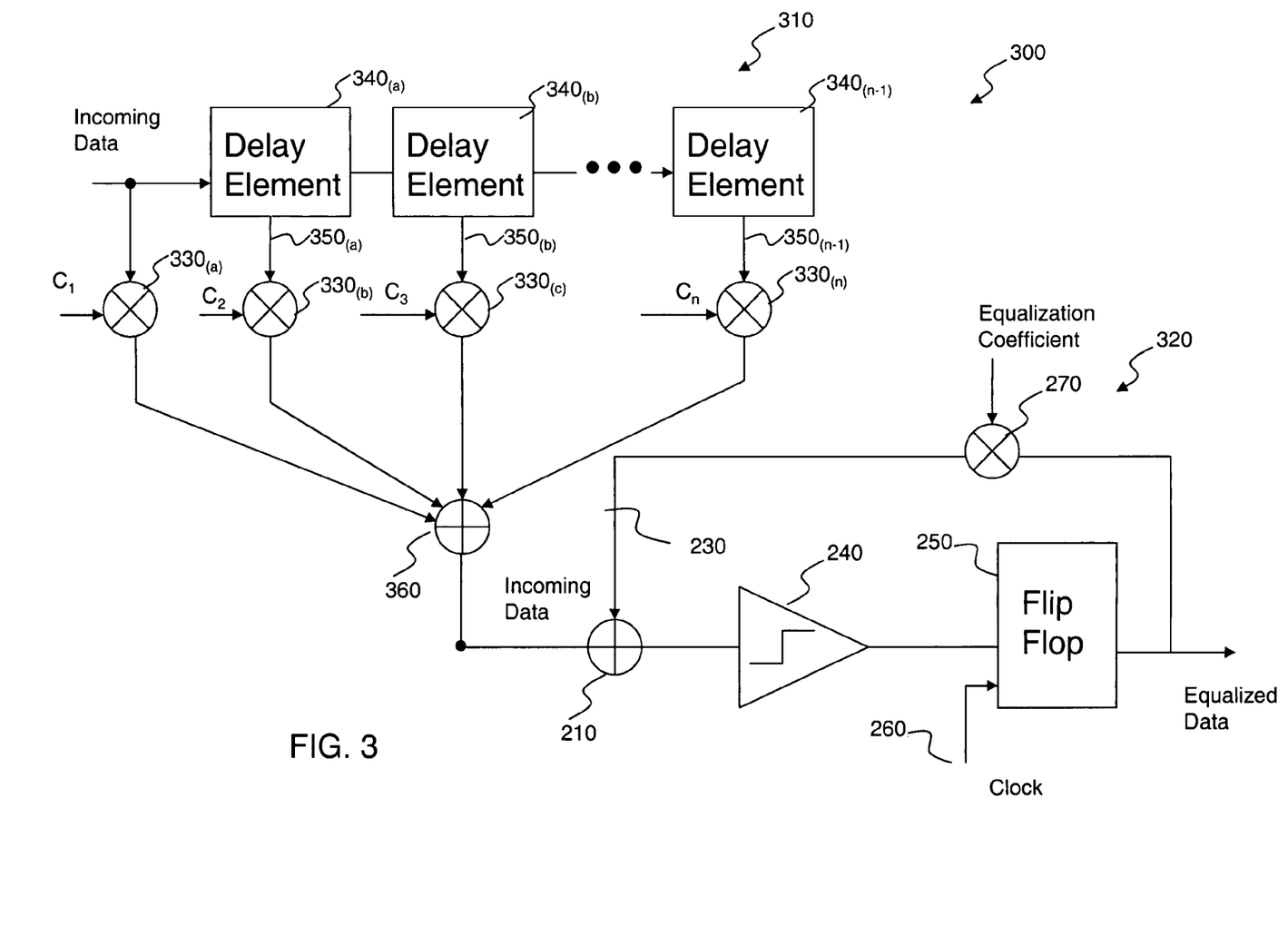
FIG. 3 is a simplified block diagram of one embodiment of a feed forward equalizer integrated with the decision feedback equalizer of FIG. 2.

The n-tap equalizer in FIG. 3 includes n multipliers 330(a)-330(n) and n−1 delay elements 340(a)-340(n−1), each of which delays a corresponding input signal by approximately one-half a symbol period. In the illustrated embodiment multipliers 330(a)-330(n) multiply the incoming data signal and delayed signals 350(a)-350(n−1) respectively by equalization coefficients c1-cn. Summer 360 then combines the feed forward output signals of multipliers 330(a)-330(n). The feed forward equalizer therefore subtracts scaled versions of previous symbols from a current symbol to reduce or eliminate channel induced pre-cursor inter-symbol interference.

The output of the feed-forward equalizer is combined with the feedback signal 230 of the decision feedback equalizer. The decision feedback equalizer 320 functions to reduce or eliminate post-cursor inter-symbol interference as previously described with respect to FIG. 2.

The feed forward equalizer and the decision feedback equalizer are both finite impulse response filters with adaptive coefficients that are adjusted by adaptation circuitry, such as, a least mean square calculation circuit (not shown). In the illustrated embodiment the equalization coefficients of the feed forward equalizer and the decision feedback equalizer adapt to a filter response that matches the communication channel to reduce channel induced distortion.

One of skill in the art will appreciate that the feed forward equalizer and the decision feedback equalizer can each have any number of taps. The optimum number of taps is related to the amount of pulse broadening (level of distortion) incurred during transmission. Practically, higher levels of inter-symbol interference can be compensated by increasing the number of taps (i.e. the length) of the feed-forward equalizer and/or decision feedback equalizer.

However, the feed forward multipliers 330(a)-330(n) consume significant die area and power as compared to the multipliers of the decision feedback equalizer. For example, the decision feedback multiplier(s) is driven by a binary signal having a high or low value (i.e. one or minus one for a differential implementation). Therefore, in operation the output of the decision feedback multiplier(s) is simply the equalization coefficient or the negative value of the equalization coefficient. By way of contrast, the multipliers 330(a)-330(n) of the feed forward equalizer multiply equalization coefficients c1-cn by incoming delayed analog voltage signals. The feed forward multipliers therefore require greater processing capability than the corresponding multipliers of the feedback equalizer.

Therefore, the design of a balanced receiver typically involves a tradeoff between processing complexity of the feed-forward filter and receiver sensitivity. In addition, the delay elements 340(a)-340(n−1) of the feed-forward filter may be implemented as dynamic sample and hold registers. However, implementations utilizing dynamic registers typically require additional clock recovery circuitry to generate n−1 extracted clock signals which can then be used to clock the delay elements 340(a)-340(n−1). Therefore, for ease of implementation, the delay cells often comprise a series of cascaded buffer stages that provide the desired delay.

However, the absolute value of the delay through a cascaded buffer stage typically varies with variations in the manufacturing process, operating temperature and supply voltage. In addition, for high speed applications high speed buffer stage(s) significantly increase the cost and the die size of the receiver. For example, high speed receiver components fabricated from a complementary metal oxide semiconductor (CMOS) process may include shunt peaking inductive loads to tune out the parasitic capacitive loading on the inputs of the buffer and increase the bandwidth of the device.

However, spiral inductors are relatively large devices that consume considerable die area driving up the relative cost and size of the receiver. In addition, each of the buffers generate inter-symbol interference that must be compensated for by the decision feedback equalizer.

This problem is further complicated by the relatively large number of buffers typically required to provide the desired delay. For example, in a 10 Gbps system, each half period delay cell should provide approximately 50 ps of delay which typically requires three or more cascaded buffers each of which have a maximum of about 15-20 ps of delay. Therefore a five tap 10 Gbps feed forward equalizer typically needs on the order of about twelve cascaded high speed buffers.

Figure 4:
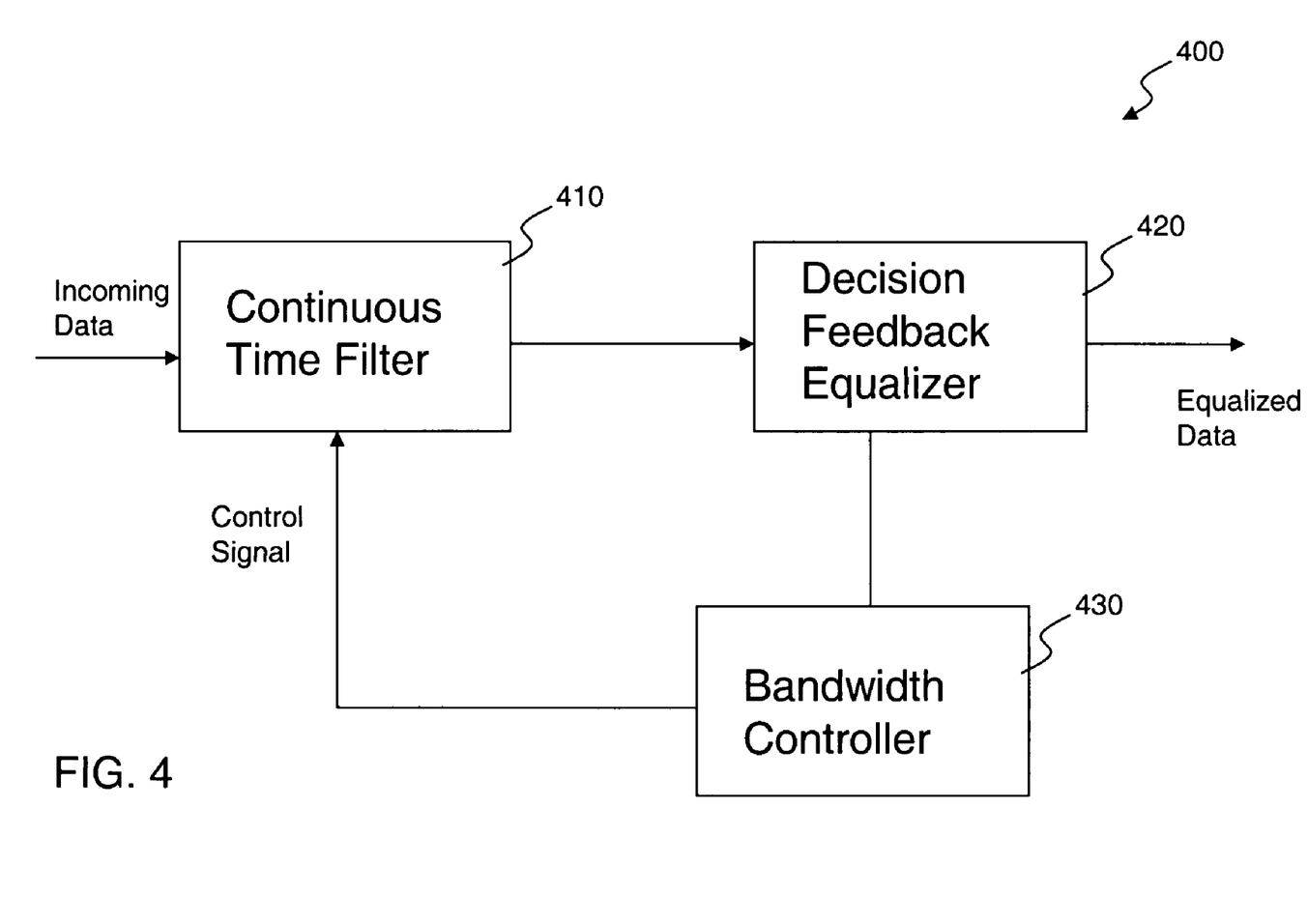
FIG. 4 is a simplified block diagram of a receiver having a continuous time filter integrated with the decision feedback equalizer of FIG. 2 in accordance with an exemplary embodiment of the present invention.

To address problems such as these, a receiver 400 constructed in accordance with one embodiment of the present invention may include a programmable continuous time filter 410 coupled with a decision feedback equalizer 420 to compensate for channel induced distortion in an incoming signal as illustrated in FIG. 4. In the illustrated embodiment the programmable continuous time filter 410 is an adaptive equalizer that compensates for pre-cursor distortions in the incoming signal. In addition, the continuous time filter 410 may serve to pre-distort the incoming signal to optimize the performance of the decision feedback equalizer. In this embodiment a bandwidth controller 430 adjusts the bandwidth of the continuous time filter 410 to tune the frequency response of the continuous time filter to approximate the inverse of at least a portion of the frequency response of the communication channel.

Figure 5:
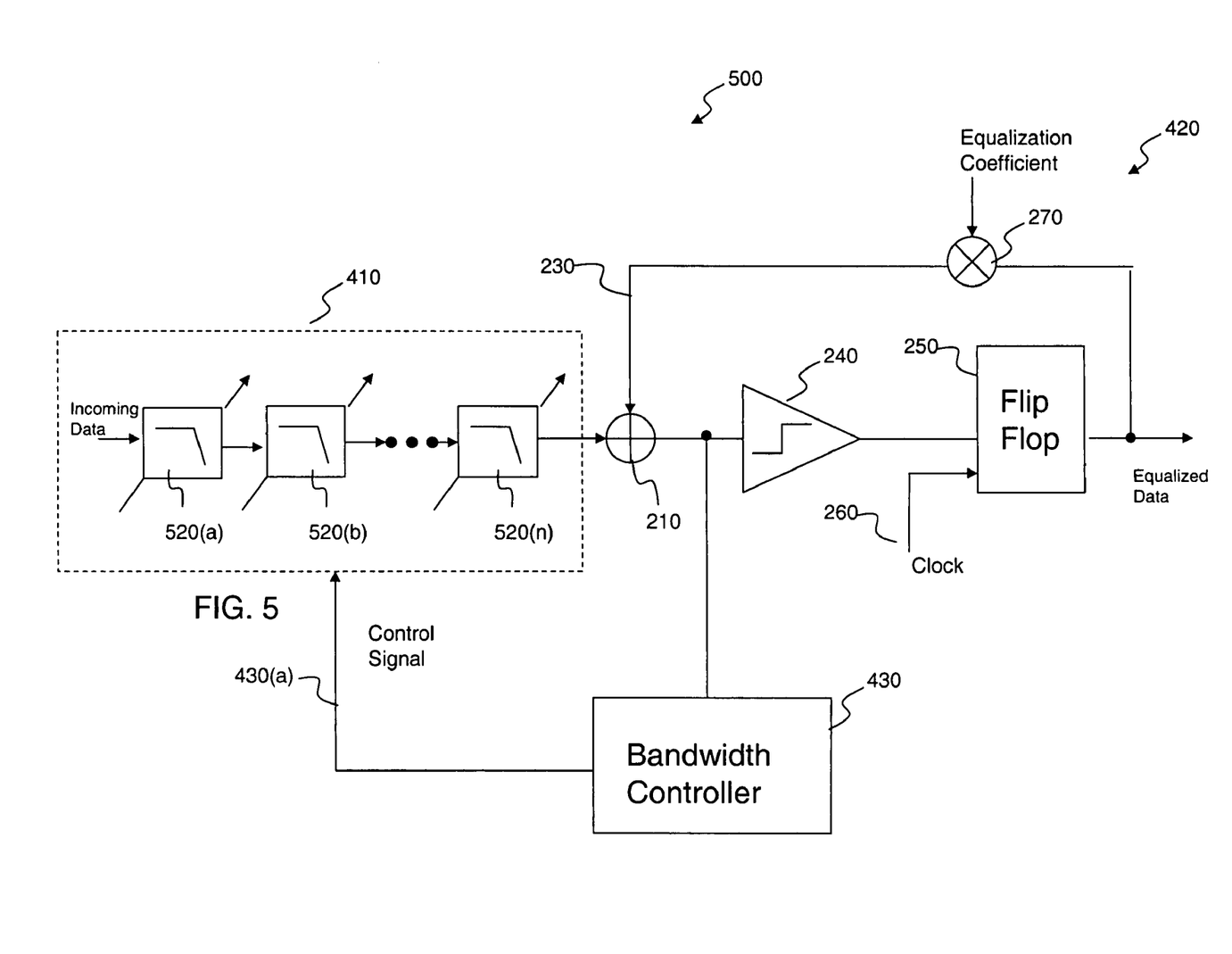
FIG. 5 is a simplified block diagram of the receiver of FIG. 4 wherein the continuous time filter includes one or more cascaded low pass filters with adjustable filter bandwidth in accordance with an exemplary embodiment of the present invention.

FIG. 5 is a simplified block diagram of a high speed receiver 500 having an integrated continuous time filter 410 and decision feedback equalizer 420 in accordance with one embodiment of the present invention. In this embodiment the programmable continuous time filter 410 comprises one or more cascaded low pass filters 520(a-n) where the output of a first low pass filter (e.g. 520(a)) is coupled to the input of the next low pass filter (e.g. 520(b)).

In one embodiment each of the low pass filters may have approximately the same frequency response. In this embodiment the bandwidth controller 430 generates, by way of example, a common control signal 430(a) that adjusts the bandwidth of each of the low pass filters 520(a-n) to reduce the level of pre-cursor ISI.

However, one of skill in the art will appreciate that the low pass filters 520(a-n) of the continuous time filter need not have the same frequency response. Rather, the frequency response of each of the individual filters may be unique and optimized for a particular application. In addition, the individual filters 520(a-n) need not be driven by a common control signal. Rather a real time closed loop optimizer, such as, for example, a least means square optimizer may individually adjust the bandwidth of the individual filters to compensate for the channel induced distortion.

Figure 6:
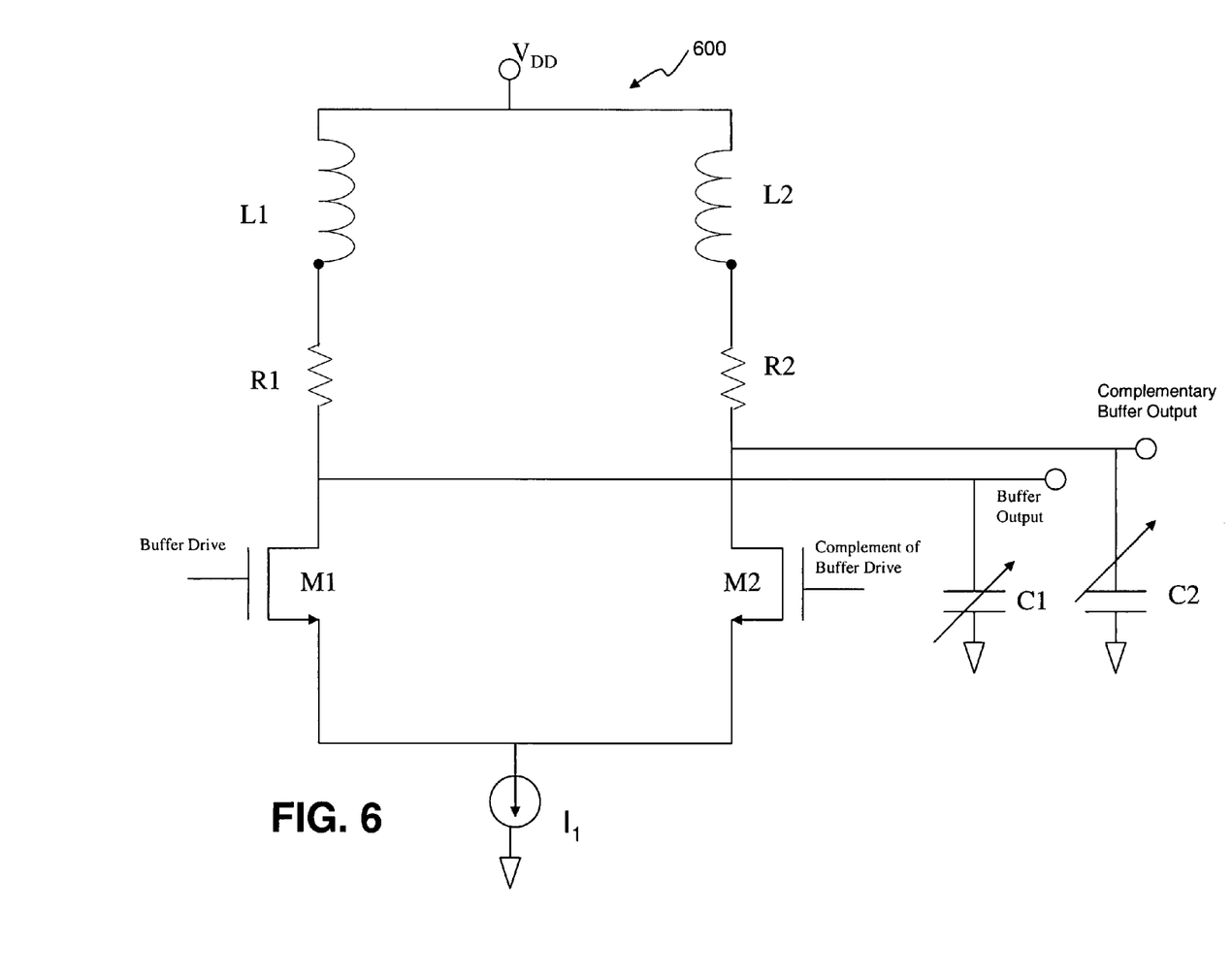
FIG. 6 is a simplified circuit diagram of the low pass filter of FIG. 5 in accordance with an exemplary embodiment of the present invention.

In one embodiment the low pass filters comprise, by way of example, a buffer stage with a variable capacitive load which is used to adjust the bandwidth of the device. For example, FIG. 6 is a simplified circuit diagram of a single stage high speed buffer 600 for filtering the incoming data signal. In this embodiment, a differential pair of inductively loaded transistors, such as, for example, NMOS FETs M1 and M2, are coupled between a positive voltage source $V_{DD}$ and a bias current source $I_1$. Advantageously, the use of inductive loads $L_1$ and $L_2$ tunes out the parasitic capacitive loading on the inputs of the buffer and increases the bandwidth of the device.

One of skill in the art will appreciate that the invention is equally applicable to single-ended or differential implementations. One of skill in the art will further appreciate that the transistors used in the low pass filter stages of the continuous time filter may or may not be the same size. However, uniformity of device size reduces process, offset, and temperature variation affects in the performance of the continuous time filter.

In operation, NMOS FETs M1 and M2 of buffer stage 600 are driven by a complementary differential incoming signal such that when the drive signal for FET M1 is high the drive signal for FET M2 is low. In this embodiment, variable capacitors C1 and C2 are coupled to the outputs of transistors M1 and M2 respectively. The value of variable capacitors C1 and C2 can be adjusted to compensate for pre-cursor distortions in the incoming signal or to pre-distort the incoming signal to optimize the performance of the decision feedback equalizer. However, reducing the bandwidth of the low pass filters may generate inter-symbol interference in the output signal of the continuous time filter that may then need to be compensated for by the decision feedback equalizer.

Figure 7:
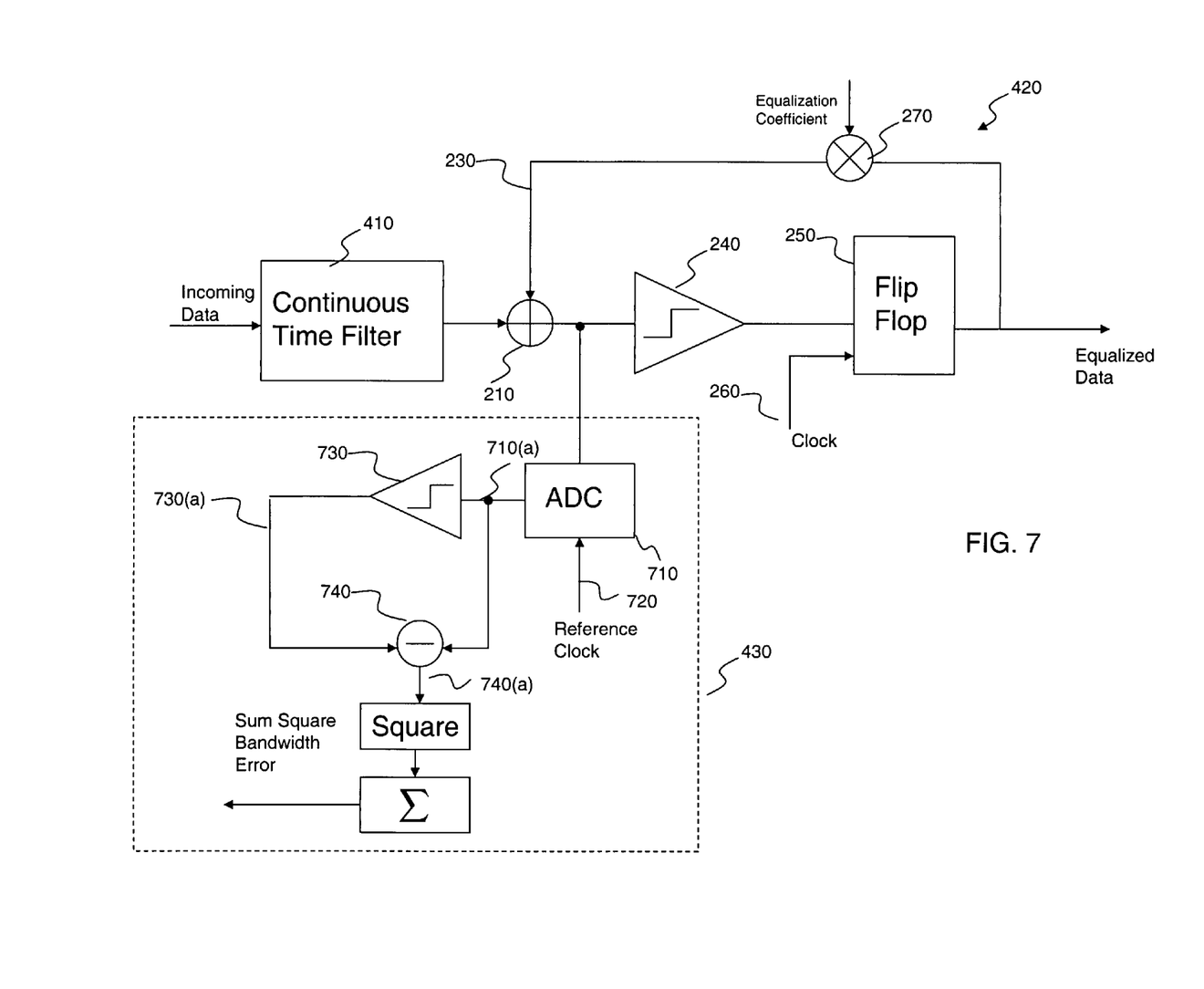
FIG. 7 is another simplified block diagram of a receiver having a continuous time filter integrated with a decision feedback equalizer and a bandwidth controller for controlling the bandwidth of the continuous time filter in accordance with an exemplary embodiment of the present invention.

FIG. 7 is a simplified block diagram of an exemplary bandwidth controller 430 integrated with the continuous time filter 410 and decision feedback equalizer 420 of FIG. 5. In this embodiment an analog to digital converter 710 converts the analog soft decision signal output by the summer 210 of the decision feedback equalizer to a digital signal. In one embodiment the analog to digital converter samples the analog soft decision at a relatively low rate in response to a low speed reference clock. The reference clock 720 may be, for example, a low-frequency signal generated by a stable oscillation source (e.g., a crystal).

In one embodiment a delay lock loop (not shown) may be used to align the transition edges of the low frequency reference clock 720 with the transition edges of clock 260 which clocks the decision feedback equalizer flip flop 250 to ensure that the bandwidth controller 430 is properly synchronized with the decision feedback equalizer. A delay lock loop which is suitable for synchronizing the reference clock 720 and clock 260 is disclosed in commonly owned U.S. Provisional Patent Application Ser. No. 60/531,095, entitled "HIGH FREQUENCY BINARY PHASE DETECTOR", filed Dec. 19, 2003, the disclosure of which is incorporated herein by reference.

In this embodiment, a digital limiter 730 compares the quantized soft decision output by the analog to digital converter 710 with a threshold and generates a binary signal (e.g., one or minus one) having a low value if the quantized signal is less than the threshold and a high value if the quantized signal is greater than or equal to the threshold. A combiner 740 generates a bandwidth error signal 740(a) by subtracting the quantized soft decision 710(a) output by the analog to digital converter with the binary signal 730(a) output by the digital limiter.

In some embodiments the bandwidth error signal 740(a) is squared and then accumulated to generate a sum square bandwidth error signal. In this embodiment, an optimization algorithm may be used to reduce the value of the sum square bandwidth error signal as a function of the bandwidth of the low pass filters of the continuous time filter 410. For example, if the sum square error is reduced in response to a reduction in the bandwidth of the continuous time filter a control signal to further reduce the bandwidth of the continuous time filter is generated. Otherwise the bandwidth of the continuous time filter is increased. As discussed above in conjunction with FIG. 5, the bandwidth controller 430 then generates at least one control signal that controls the bandwidth of the continuous time filter 410.

One of skill in the art will appreciate that the continuous time filter and the decision feedback equalizer can each have any number of taps. The optimum number of taps is related to the amount of pulse broadening (level of distortion) incurred during transmission. Practically, higher levels of inter-symbol interference can be compensated by increasing the number of taps (i.e. the length) of the continuous time filter and or decision feedback equalizer.

Referring back to FIG. 5, increasing the number of low pass filters in the continuous time filter increases the level of gain and improves the frequency response of the filter by decreasing the filter roll off as a function of frequency thereby reducing the level of precursor interference. However, increasing the number of filters also reduces the bandwidth of the continuous time filter with a corresponding increase in the level of inter-symbol interference created in the output of the continuous time filter.

Therefore, receiver design implementations involve a tradeoff between the suppression of precursor interference and the generation of post-cursor interference that should be cancelled by the decision feedback equalizer. In one embodiment a high speed receiver includes a continuous time filter having six low pass filter elements integrated with a two tap decision feedback equalizer. However, the present invention is not limited to particular filter lengths. Rather the present invention may be realized with any number of low pass filters and or filter taps as may be required for a particular application.

It will be appreciated by those of ordinary skill in the art that the invention can be embodied in other specific forms without departing from the spirit or essential character thereof. The present invention is therefore considered in all respects to be illustrative and not restrictive. The scope of the invention is indicated by the appended claims, and all changes that come within the meaning and range of equivalents thereof are intended to be embraced therein.

What is claimed is:

1. An optical communication device comprising:
   a continuous time filter having an adjustable bandwidth and at least one cascaded low pass filter, wherein the continuous time filter is configured to reduce channel induced pre-cursor interference in an incoming data signal and generate a filtered incoming data signal;
   a decision feedback equalizer, coupled to the continuous time filter, and configured to reduce post-cursor interference in the filtered incoming data signal and output a compensated signal and equalized data, the decision feedback equalizer comprising a summer that is configured to generate the compensated signal by combining an equalized feedback signal with the filtered incoming data signal; and
   a bandwidth controller configured to receive the compensated signal from the decision feedback equalizer and estimate a bandwidth error of the continuous time filter based thereon, the bandwidth controller further configured to generate a control signal based on the bandwidth error and to adjust the bandwidth of the continuous time filter using the control signal, and thereby reduce the bandwidth error as determined from the decision feedback equalizer, the bandwidth controller comprising:
      an analog to digital converter, coupled to the summer, that is configured to digitize the compensated signal;
      a digital limiter, configured to receive the digitized compensated signal from the analog to digital converter, and configured to generate a binary signal from the digitized compensated signal; and
      a combiner configured to subtract the digitized compensated signal from the binary signal to generate the control signal.

2. The communication device of claim 1 wherein the continuous time filter is configured to pre-distort the incoming data signal, based on the control signal, to thereby improve an operation of the decision feedback equalizer.

3. The communication device of claim 1 wherein each of the at least one cascaded low pass filter comprises a differential pair of transistors having adjustable capacitive loads coupled to outputs of the differential pair of transistors and configured to adjust the bandwidth of the at least one cascaded low pass filter in response to the control signal.

4. A receiver comprising:
   a continuous time filter having an adjustable bandwidth and at least one cascaded low pass filter, wherein the continuous time filter is configured to reduce channel induced distortion in information signal received from a communications channel as a function of the adjustable bandwidth, and is further configured to generate a filtered information signal;
   a decision feedback equalizer configured to receive the filtered information signal and to reduce inter-symbol interference in the filtered information signal to produce equalized data, and further configured to output a compensated signal, the decision feedback equalizer comprising a summer that is configured to generate the compensated signal by combining an equalized feedback signal with the filtered information signal; and
   a bandwidth controller configured to receive the compensated signal and to adjust the adjustable bandwidth based thereon, and thereby to tune a frequency response of the continuous time filter to approximate an inverse of at least a portion of the frequency response of the communication channel, the bandwidth controller comprising:
      an analog to digital converter, coupled to the summer, that is configured to digitize the compensated signal;
      a digital limiter, coupled to receive the digitized compensated signal from the analog to digital converter, and configured to generate a binary signal from the digitized compensated signal; and
      a combiner that is configured to subtract the digitized compensated signal from the binary signal to generate a bandwidth error signal.

5. The receiver of claim 4 wherein the bandwidth controller is configured to estimate a bandwidth error of the continuous time filter based on the compensated signal, and to adjust the adjustable bandwidth of the continuous time filter based thereon to reduce the bandwidth error.

6. The receiver of claim 4 wherein each of the at least one cascaded low pass filters comprises a differential pair of transistors having adjustable capacitive loads coupled to outputs of the differential pair of transistors and configured to adjust the bandwidth of the low pass filter.

7. The receiver of claim 4 wherein the receiver further comprises an optical detector configured to convert the received information signal to an electrical signal.

8. An optical communication device comprising:

a continuous time filter having at least one cascaded low pass filter, each of the at least one cascaded low pass filter having an adjustable bandwidth, wherein the continuous time filter is configured to reduce channel induced pre-cursor interference in an incoming data signal and generate a filtered incoming data signal;

a decision feedback equalizer, coupled to the continuous time filter, and configured to reduce post-cursor interference in the filtered incoming data signal and output a compensated signal, the decision feedback equalizer comprising a summer that is configured to generate the compensated signal by combining an equalized feedback signal with the filtered incoming data signal; and a bandwidth controller configured to receive the compensated signal from the decision feedback equalizer and estimate a bandwidth error of the continuous time filter based thereon, the bandwidth controller further configured to generate a control signal based on the bandwidth error and to adjust the bandwidth of the at least one cascaded low pass filter using the control signal, and thereby reduce the bandwidth error as determined from the decision feedback equalizer, the bandwidth controller comprising:

an analog to digital converter, coupled to the summer, that is configured to digitize the compensated signal:

a digital limiter, configured to receive the digitized compensated signal from the analog to digital converter, and configured to generate a binary signal from the digitized compensated signal; and a combiner configured to subtract the digitized compensated signal from the binary signal to generate the control signal;

wherein the continuous time filter is further configured to pre-distort the incoming data signal, based on the control signal, to thereby improve an operation of the decision feedback equalizer.

9. The communication device of claim 8 wherein each of the at least one cascaded low pass filter comprises a differential pair of transistors having adjustable capacitive loads coupled to outputs of the differential pair of transistors and configured to adjust the bandwidth of the at least one cascaded low pass filter in response to the control signal.

* * * * *

UNITED STATES PATENT AND TRADEMARK OFFICE
CERTIFICATE OF CORRECTION

PATENT NO. : 7,522,847 B2
APPLICATION NO. : 10/774724
DATED : April 21, 2009
INVENTOR(S) : Afshin Momtaz

It is certified that error appears in the above-identified patent and that said Letters Patent is hereby corrected as shown below:

Column 8, Line 46, please replace, "signal:" with --signal;--

Column 10, Line 5, please replace, "signal:" with --signal;--

Signed and Sealed this

Twenty-sixth Day of May, 2009

JOHN DOLL
*Acting Director of the United States Patent and Trademark Office*